Apr. 3, 1923.
M. J. LA RIVIERE
1,450,779
ANTISKID DEVICE
Filed Feb. 24, 1922
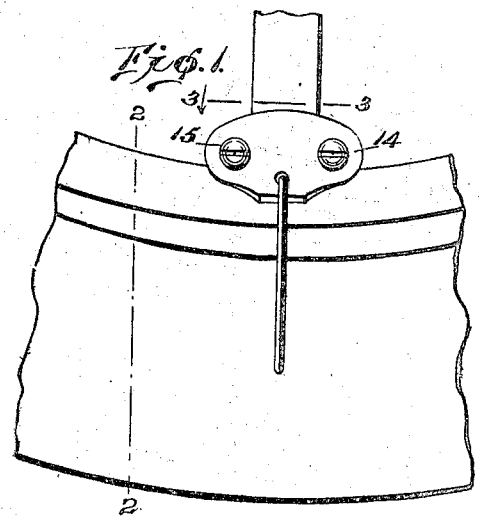
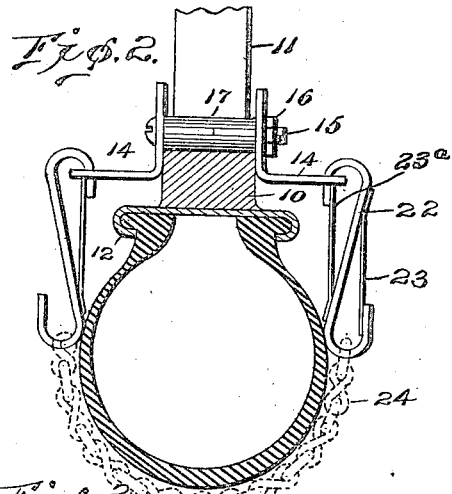
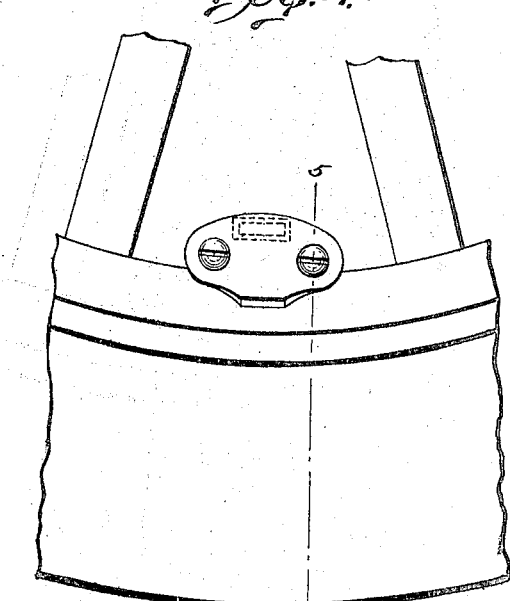
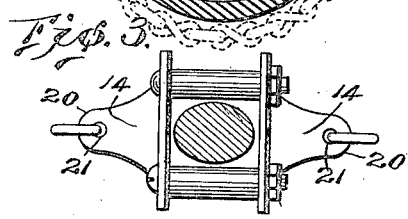
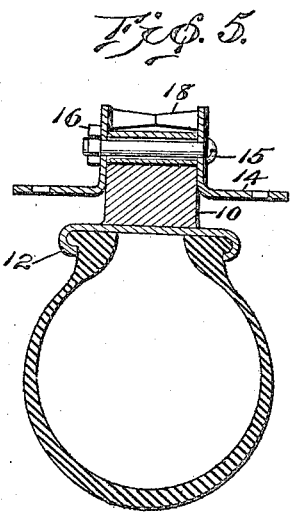
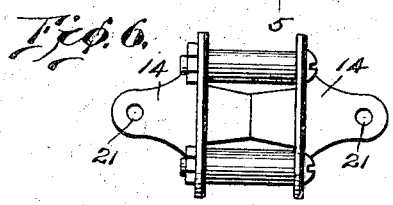
Inventor
M. J. La Riviere
By R. J. Blair
Attorney Patented Apr. 3, 1923.

1,450,779

UNITED STATES PATENT OFFICE.

MATHIAS J. LA RIVIERE, OF WATERBURY, CONNECTICUT.

ANTISKID DEVICE.

Application filed February 24, 1922. Serial No. 539,008.

*To all whom it may concern:*

Be it known that MATHIAS J. LA RIVIERE, a citizen of the United States, residing at 59 Ludlow Street, Waterbury, in the county of New Haven and State of Connecticut, have invented certain new and useful Improvements in Antiskid Devices, of which the following is a specification.

This invention relates to improvements in anti-skid devices for vehicles and more particularly to that type comprising elements adapted to be permanently secured to the wheels of the vehicles and have associated therewith quickly detachable cooperative elements.

One of the objects of the present invention is to provide a simple and practical anti-skid device of the above general character which may be inexpensively manufactured and assembled.

A further object is to provide an anti-skid device of the above character in which the elements co-acting with the tread of the wheel may be easily and quickly removed or applied without the necessity of moving the vehicle as is required in that form where the anti-skid device extends entirely about the circumference of the wheel.

A further object is to provide a device of the above character in which the part permanently secured to the wheel is suitably cushioned and clamped in operative relation thereto so as to prevent marring or mutilation of the surface or spokes of the wheel, and also prevent rattling while in use.

Other objects will be in part obvious from the annexed drawing and in part indicated in connection therewith from the foregoing analysis of this invention.

This invention accordingly consists in the features of construction, combination of parts and in the unique relation of the various members and to the relative proportioning and disposition thereof, all as more completely outlined hereinafter.

To enable others skilled in the art to which this invention relates to so comprehend the underlying features thereof that they may embody the same by numerous modifications in structure and relation contemplated by this invention, drawings depicting preferred forms have been annexed as an illustrated embodiment forming part of this disclosure and in such drawings like characters of reference denote corresponding parts throughout all the views, in which—

Figure 1 is a fragmentary elevation of a portion of a vehicle wheel with the anti-skid device applied to the spoke;

Figure 2 is a cross sectional view taken substantially along the line 2—2, Figure 1;

Figure 3 is a cross sectional view, taken substantially along the line 3—3, Figure 1;

Figure 4 is an elevation of a portion of a vehicle wheel with the anti-skid device applied to the felly;

Figure 5 is a cross sectional view taken substantially on the line 5—5, Figure 4; and Figure 6 is a plan view of the anti-skid device applied as in Figure 5.

Referring now to the drawings in detail and more particularly to Figure 1, 10 denotes the felly of a vehicle wheel provided with spokes 11, a tire securing rim 12, and a tire preferably of the usual pneumatic type secured thereto, although it is, of course, to be understood that solid rubber tires may be used as is customary with heavy vehicles.

At intervals about the felly are secured a plurality of clamps of either or both the types shown in detail in Figures 2 or 4.

These clamping devices comprise two L-shaped plates 14 provided with holes through which bolts 15 are adapted to pass, and firmly clamp the members 14 against the felly 10 by tightening the nuts 16. The bolts 15 are preferably covered with rubber tubing 17, thereby to prevent marking of the spokes or felly and also to cushion the device against vibration which might cause more or less rattling. With the form shown more clearly in Figures 4 and 5, there is preferably provided two inwardly extending lugs 18. The abutting ends of the lugs form a point of support whereby, as the nut and bolt 15, 16, are tightened, the compressive action will be exerted upon the felly 10 to hold the parts in place.

The outwardly extending portions 20 of the members 14 are provided with holes 21 through which fastening devices 22, preferably of the form shown in Figure 2, may be secured. These fastening devices may be provided with guard springs 23 and 23ª, thereby to prevent both the unseating of the chain 24 from its point of attachment in the fastening devices 22, and to retain these fastening devices in the proper operative relation to the members 14 until manually removed. The guard springs 23 and 23ª are preferably of the usual resilient finger type. It may, however, be desirable to remove one of the guards 23, as shown at the left of Figure 2, in order to permit a broken portion of the cross chain 24 to drop away from the rest of the device if such situation should occur, thereby preventing injury to the fender of the car.

It is believed that from the above description the construction, method of use and operation will be clear to those familiar with the subject. It is sufficient to state, however, that these devices as shown in Figures 1 and 4, are permanently secured to the wheel in the position shown. A corresponding number of cross chains are carried in the tool kit of the car, and, when it is desired to apply the same to the wheels in wet or slippery weather the fastening device 22 and cross chains 24 may be easily passed around the tire, as shown in Figure 2, and snapped into place, without the necessity of moving the car. This construction is particularly desirable and is of considerable advantage should the car, for instance, become stalled in the mud where it is impossible to put on that type of anti-skid device that passes entirely about the periphery of the wheel. Any number may be secured to the wheel and preferably both types are carried in order that any desired degree of traction may be obtained.

It is thus seen that the present invention provides a simple and practical device, well adapted to accomplish, among others, all of the objects and advantages hereinbefore set forth. It is realized that considerable variation is possible in the details of construction and arrangement of parts without departing from the spirit of the invention and, therefore, I do not intend to limit myself to the specific form shown and described.

I claim:

In an anti-skid device, in combination, two L-shaped members adapted to be clamped to the opposite sides of the felly of a wheel, bolts to bind said members into engagement with said felly, said bolts being spaced apart sufficiently to permit the enclosing of a spoke therebetween, cushioning means enclosing said bolts, and means surrounding the tire and detachably secured to the wings of said L-shaped members adapted to prevent skidding.

In testimony whereof I affix my signature.

MATHIAS J. LA RIVIERE.